United States Patent [19]
Gay

[11] Patent Number: 5,567,746
[45] Date of Patent: *Oct. 22, 1996

[54] MOLDABLE FERROMAGNETIC PARTICLES AND METHOD

[75] Inventor: David E. Gay, Noblesville, Ind.

[73] Assignee: General Motors Corporation, Detroit, Mich.

[ * ] Notice: The term of this patent shall not extend beyond the expiration date of Pat. No. 5,472,661.

[21] Appl. No.: 357,815

[22] Filed: Dec. 16, 1994

[51] Int. Cl.⁶ .............................. C08K 7/16; B05D 7/00
[52] U.S. Cl. .................. 523/220; 523/223; 419/35; 419/38; 264/121; 264/122; 264/126; 427/185; 427/213; 427/220
[58] Field of Search .................... 523/220, 223; 419/35, 38; 427/127, 185, 213, 215, 220; 264/121, 122, 125, 126

[56] References Cited

U.S. PATENT DOCUMENTS

| | | |
|---|---|---|
| 3,725,521 | 4/1973 | Ebling .................... 264/104 |
| 4,065,519 | 12/1977 | Koch . |
| 4,696,725 | 9/1987 | Ochiai et al. ............ 252/62.54 |
| 5,069,972 | 12/1991 | Versic ..................... 428/407 |
| 5,211,896 | 5/1993 | Ward et al. ............... 264/126 |
| 5,225,459 | 7/1993 | Oliver et al. ............. 523/220 |
| 5,256,326 | 10/1993 | Kawato et al. ......... 252/62.54 |
| 5,268,140 | 12/1993 | Rutz et al. ................ 419/54 |
| 5,271,891 | 12/1993 | Gay et al. ................. 419/36 |
| 5,272,008 | 12/1993 | Shain et al. .............. 428/407 |

OTHER PUBLICATIONS

U.S. Patent Appliation (Reference No. H–189969) entitled "Lubricous Ferromagnetic Particles", filed concurrently herewith.
U.S. Patent Application (Reference No. H–191688) entitled "Method of Adding Particulate Additives to Metal Particles", filed concurrently herewith.

*Primary Examiner*—Patrick Ryan
*Assistant Examiner*—Marie R. Yamnitzky
*Attorney, Agent, or Firm*—Lawrence B. Plant

[57] ABSTRACT

Moldable ferromagnetic particles and method of making a magnetizable molding therefrom. The ferromagnetic particles are spray-coated with a slurry comprising insoluble thermoplastic particles suspended in a solution of a soluble polymer to produce a coating on the ferromagnetic particles which comprises a majority of the insoluble thermoplastic particles embedded in a lesser amount of a binder polymer. When compression molded, the insoluble thermoplastic particles form a continuous matrix for the ferromagnetic particles.

12 Claims, 2 Drawing Sheets

MOLDABLE FERROMAGNETIC PARTICLES AND METHOD

This invention relates to moldable ferromagnetic particles and a method of making a magnetizable molding therefrom which comprises a plurality of ferromagnetic particles distributed throughout a matrix of a substantially insoluble thermoplastic polymer.

BACKGROUND OF THE INVENTION

It is known to mold hard (i.e., permanent) magnets as well as soft magnetic cores for electromagnetic devices (e.g., transformers, inductors, motors, generators, relays, etc.) from ferromagnetic particles dispersed throughout a polymer matrix. Soft magnetic cores are molded from ferromagnetic particles such as iron, and certain silicon, aluminum, nickel and cobalt alloys thereof (hereafter generally referred to as iron) dispersed throughout a thermoset or thermoplastic polymer matrix. Such cores serve to concentrate the magnetic flux induced therein from an external source, e.g., current flowing through an electrical coil wrapped thereabout, and have little or no residual magnetism after the source is removed, e.g., current flow discontinued. Permanent magnets are similarly molded from such ferromagnetic materials as magnetic ferrites, samarium-cobalt alloys, iron-neodymium-boron alloys, and the like, and are subsequently permanently magnetized.

In making such moldings, the ferromagnetic particles have been mechanically mixed/blended with particles of the matrix-forming polymer, and the mixture compression molded in a suitable mold. Mechanical mixing/blending however, does not result in a uniform distribution of the ferromagnetic particles throughout the polymer matrix, or in insulation (e.g., electrical or protective) of each and every ferromagnetic particle from the next by the matrix-forming polymer as is required for many applications. Interparticle electrical insulation, for example, is necessary to reduce core losses in soft magnetic cores used in AC applications. In permanent magnets, interparticle protective insulation is desirable to protect the ferromagnetic particles from corrosion.

Magnets and soft magnetic cores have also been made by individually encapsulating each of the ferromagnetic particles within a soluble thermoplastic polymer shell formed by spray-coating the polymer onto the surface of each of the particles as they move in a fluidized stream through a coating zone in an appropriate coating machine. The thusly encapsulated particles are then compression molded to form the desired magnetizable article. For example, Ward et al. U.S. Pat. No. 5,211,896 discloses encapsulating soft magnetic iron particles in a shell of polyetherimide, polyamide-imide or polyethersulfone which is spray coated thereon from a solution thereof. Similarly, U.S. Pat. No. Shain et al. 5,272,008, discloses iron-neodymium-boron permanently magnetizable particles having epoxy and polystyrene layers spray-coated thereon. By so individually encapsulating each and every ferromagnetic particle prior to molding, (1) a uniform distribution of the ferromagnetic particles throughout the polymer matrix is achieved, (2) clumping of the ferromagnetic particles and/or the matrix-forming polymer together is avoided, and (3) each of the particles is insulated from the next by the polymer.

According to Ward et al. U.S. Pat. Nos. 5,211,896 and Shain et al. 5,272,008, the thermoplastic polymer is dissolved in an appropriate solvent, and the particles spray-coated in a fluidized stream thereof. U.S. Pat. Nos., Smith-Johnson 3,992,558; Lindlof et al. 3,117,027; Reynolds 3,354,863; Wurster 2,648,609 and Wurster 3,253,944 inter alia are examples of coating apparatus suitable for this purpose. Preferably, Ward et al.'s and Shain et al.'s particles are coated using a Wurster-type fluidized-stream, spray-coating apparatus and method. Wurster-type equipment comprises a cylindrical outer vessel having a perforated floor through which a heated gas passes upwardly to heat and fluidize a batch of ferromagnetic particles therein. A concentric, open-ended, inner cylinder is suspended above the center of the perforated floor of the outer vessel. A spray nozzle centered beneath the inner cylinder sprays the thermoplastic solution (i.e., polymer dissolved in a solvent) upwardly into the inner cylinder as the fluidized ferromagnetic particles pass upwardly through the spray in the inner cylinder. The particles circulate upwardly through the center of the inner cylinder and downwardly between the inner and outer cylinders. The gas (e.g., air) that fluidizes the metal particles also serves to vaporize the solvent causing the dissolved thermoplastic to deposit onto the particles. After repeated passes through the coating zone in the inner cylinder, a sufficient thickness of polymer accumulates over the entire surface of each particle as to completely encapsulate such particle.

The choice of matrix-forming polymers available for individually encapsulating moldable, ferromagnetic particles as described above is limited in that useful polymers must satisfy several criteria. First, the polymer must be a thermoplastic in order to permit subsequent fusion and molding into finished articles. Second, the polymer must be durable enough to resist any chemically or thermally hostile environments in which the finished article is to be used. Third, the polymer must be sufficiently soluble in industrially acceptable solvents that it can be coatable in the manner described. Unfortunately, many polymers which satisfy the first and second requirements do not satisfy the third requirement, i.e., are not sufficiently soluble in acceptable solvents that they can be coated onto the ferromagnetic particles as described above.

BRIEF DESCRIPTION OF THE INVENTION

This invention provides unique moldable ferromagnetic particles and a method of making a magnetizable molding therefrom, which molding comprises a plurality of ferromagnetic particles distributed throughout a matrix of a durable, substantially insoluble, thermoplastic polymer such that each particle is insulated one from the next by such polymer. By "substantially insoluble" is meant either not soluble or so slightly soluble that a solution thereof contains too little dissolved polymer to adequately encapsulate the individual ferromagnetic so as to effectively insulate them from each other A carrier solution for the insoluble polymer is prepared comprising a soluble, polymer binder (preferably a thermoplastic) dissolved in a suitable solvent. A plurality of small particles (i.e., smaller than the ferromagnetic particles) of the desired, substantially insoluble thermoplastic, matrix-forming polymer are mixed into the solution to provide a slurry of the insoluble particles suspended in the solution of soluble polymer. The ferromagnetic particles are then spray-coated (e.g., ala the Wurster process supra) with the slurry so as to coat the surfaces of each of the ferromagnetic particles therewith. Evaporation of the solvent from the solution then leaves a layer of the substantially insoluble thermoplastic polymer particles entrapped in a skin of the soluble binder polymer which serves to adhere or "glue" the insoluble polymer particles onto the surfaces of the ferromagnetic particles. The insoluble thermoplastic particles will comprise a majority amount of the insoluble-soluble polymer layer. By majority amount is meant about 70% or more by weight. The thusly coated ferromagnetic particles are then placed in a mold, heated to the melt flow temperature of the insoluble polymer particles, and compressed under sufficient pressure to cause the insoluble polymer particles clinging to the surfaces of the ferromagnetic particles to coalesce with each other, and to flow over, around and between the ferromagnetic particles so as to insulate each from the next throughout the molding and to insure a substantially uniform distribution of the particles throughout the polymer. Cooling of the molded article solidifies the insoluble polymer matrix about the ferromagnetic particles.

DETAILED DESCRIPTION OF THE INVENTION

Figure 1:
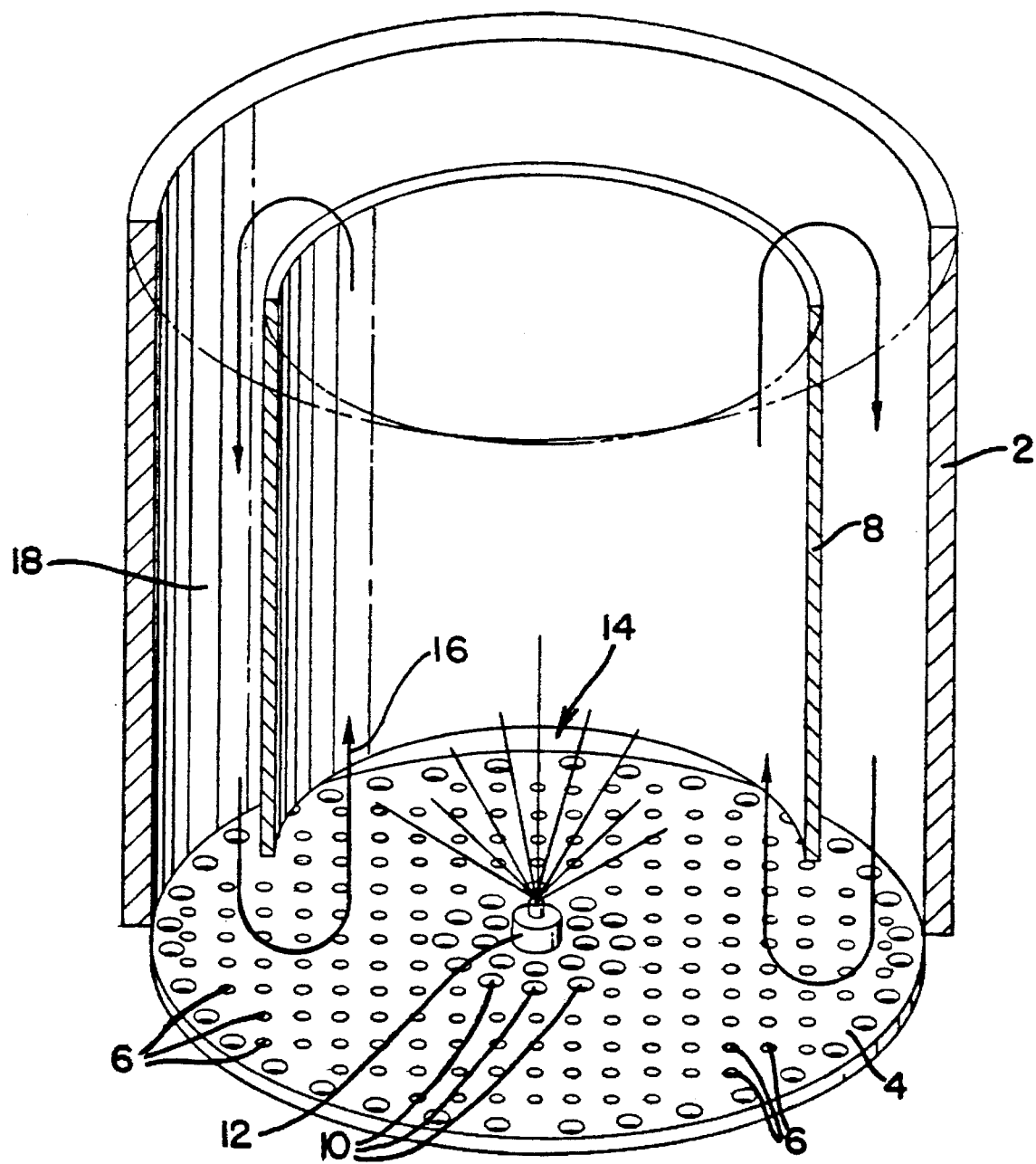
FIG. 1 illustrates, in a sectioned perspective view, a Wurster-type fluidized stream coater.

The ferromagnetic particles will have an average particle size between about 5 microns and about 500 microns, depending on the nature (i.e., Fe, rare-earth alloy, ferrite, etc.) of the particles with an average particle size ranging between about 100–120 microns. Preferred such materials are commercially available from the Hoeganaes Company as grade 1000C with an average particles size of about 100 microns or SC 40 Base Iron having an average particle size of about 180 micron. On the other hand, ferrites suitable for making hard magnets range in size from about 1 micron to about 100 microns with an average size of about 20 microns to about 60 microns. Likewise, rare-earth (e.g., iron-neodymium-boron) ferromagnetic particles for hard magnets will range in size from about 10 microns to about 300 microns with an average particle size of about 100–120 microns. The insoluble, thermoplastic particles clinging to the surface of the ferromagnetic particles will be much smaller than the ferromagnetic particles so that a multitude thereof are needed to cover the surface of each ferromagnetic particle. Such insoluble thermoplastic particles will vary in size from about 1 micron to about 30 microns with an average particle size of about 10–20 microns.

The soluble binder polymer will preferably be a thermoplastic, but need not be such, since it is used only in small quantities which do not interfere with the molding process. In this regard, the amount of soluble binder polymer used to glue the insoluble polymer particles to the ferromagnetic particles will vary somewhat depending on the composition of the binder, and the composition and particle size of the insoluble polymer, but will preferably be only that amount which is needed to glue the insoluble polymer particles to the ferromagnetic particles. Hence, typically the binder polymer will comprise less than about 30% by weight of the soluble-insoluble polymer layer and preferably about 10% to about 25% by weight of the layer. Chemically, the soluble polymer will preferably be different than the insoluble polymer, but may in some instances be naught but a shorter chain, lower molecular weight species of the insoluble polymer, which variant is sufficiently dissolvable to function as the binder for retaining the insoluble polymer species on the surface of the ferromagnetic particles. Similarly, some suitable polymers are slightly soluble. If they are sufficiently soluble (i.e., at least about 20 weight percent of the polymer is soluble) to form an adequate binder film for the insoluble portion thereof, such polymers are within the scope of this invention and will perform the dual function of being both the soluble binder polymer and the insoluble matrix-forming polymer.

For permanent magnets, the ferromagnetic particles may comprise ferrites or rare-earth alloy magnet materials, or the like. For such permanent magnets, the preferred substantially insoluble, matrix-forming polymer will preferably comprise polyamides such as Nylon 6/6, Nylon 11, Nylon 6 and Nylon 12, or fluorocarbons such as tetrafluoroethylene (TFE) and fluorinated ethylene-propylene (FEP). However, other insoluble polymers such as polyethylene terephthalate (PET), or polyphenylene sulfide (PPS), or slightly soluble polymers such as polyvinylidene difluoride (PVDF) [20% soluble in n-n-dimethyl acetamide], or polybenzimidazole (PBI) [20% soluble in 1-methyl-2-pyrrlidinone (NMP) with lithium chloride] may also be used. The insoluble particles are suspended in a solution of a soluble polymer which preferably comprises either polystyrene or an uncured epoxy dissolved either in acetone or toluene, as appropriate to the particular soluble polymer. However, other soluble polymers such as polyacrylate, polycarbonate, or polyetherimide may also be used in conjunction with suitable solvents therefor such as methylene chloride or 1-methyl-2-pyrrlidinone, as appropriate to the particular soluble polymer. For such permanently magnetizable moldings, the insoluble, matrix-forming polymer will preferably comprise about 1.5 percent to about 4 percent by weight of the coated ferromagnetic particle, and the soluble polymer will comprise about 0.1 to about 0.2 percent by weight of the coated ferromagnetic particle.

For soft magnetic cores, the insoluble, matrix-forming polymer will preferably comprise polyphenylene sulfide, polyphthalamide, polybenzimidazole or certain polyamides (e.g., Nylon 6 or Nylon 66) and polyesters (e.g., polyethyleneteraphthalate or polybutyleneteraphthalate). For such soft magnetic cores, particles of the insoluble polymer will be suspended in a solution of soluble polymers such as polyetherimide (e.g., ULTEM™ from the General Electric Co.), polyamideimide (e.g., TORLON™ from Amoco Corporation), polyethersulfone (e.g., VICTREX™ from the ICI Americas Corp.), polystyrene (e.g., G2 from the Amoco Corp.) or any of a variety of silicones or acrylates (e.g., Acryloid B-66 from the Rhom & Haas Corp.) dissolved in a suitable solvent such as methylene chloride or any of a variety of other solvents such as acetone, toluene, or N-methyl-pyrrilidinone (NMP), as appropriate to the particular soluble polymer. In soft magnetic cores, the insoluble matrix-forming thermoplastic polymer will comprise about 0.4 to about 0.75 percent by weight of the coated ferromagnetic particle, and the soluble polymer will comprise about 0.1 to about 0.2 percent by weight of the coated ferromagnetic particle.

Partially soluble polymers may be used to function as both the soluble polymer and the insoluble polymer. Hence for example, polybenzimidazole is soluble in NMP with lithium chloride up to about 20 percent of its weight. The dissolved 20 percent is adequate to coat the ferromagnetic particles sufficiently to adhere or glue the insoluble component thereof onto the surfaces of the ferromagnetic particles, but inadequate to provide adequate encapsulating-insulating coating all by itself.

Ferromagnetic particles are coated using a Wurster-type, fluidized stream, spray-coating apparatus discussed above and schematically illustrated in FIG. 1. Essentially the apparatus comprises an outer cylindrical vessel 2 having a floor 4 with a plurality of perforations 6 therein, and an inner cylinder 8 concentric with the outer vessel 2 and suspended over the floor 4. The perforations 10 and 20 at the center of the floor 4 and at the periphery of the plate 4 respectively are larger than those lying therebetween. A spray nozzle 12 is centered in the floor 4 beneath the inner cylinder 8, and directs a spray 14 of the suspension to be coated into the coating zone within the inner cylinder 8. A batch of iron particles (not shown) is placed atop the floor 4, and the vessel 2 closed. Sufficient warm air is pumped through the perforations 6 in the floor 4 to fluidize the particles and cause them to circulate within the coater in the direction shown by the arrows 16. In this regard, the larger apertures 10 in the center of the floor allow a larger volume of air to flow upwardly through the inner cylinder 8 than in the annular zone 18 between the inner and outer cylinders 8 and 2, respectively. As the particles exit the top of the inner cylinder 8 and enter the larger cylinder 2, they decelerate and move radially outwardly and fall back down through the annular zone 18. The large apertures 20 adjacent the outer vessel provide more air along the inside face of the outer wall of the outer vessel 2 which keeps the particles from statically clinging to the outer wall as well as provides a transition cushion for the particles making the bend into the center cylinder 8.

During startup, the particles are circulated, in the absence of any spray, until they are heated to the desired coating temperature by the heated air passing through the floor 4. After the particles have been thusly preheated, the desired suspension of insoluble polymer and dissolved polymer is pumped into the spray nozzle 12 where a stream of air sprays it upwardly into the circulating bed of particles and the process continued until the desired amount of insoluble polymer has been deposited onto the ferromagnetic particles. Sonic or ultrasonic vibration or the like may be applied to the plumbing conducting the slurry to the nozzle from the mixing tank to keep the lubricant particles in suspension all the way to the nozzle 12. The amount of air needed to fluidize the ferromagnetic particles varies with the batch size of the particles, the precise size and distribution of the perforations in the floor 4 and the height of the inner cylinder 8 above the floor 4. Air flow is adjusted so that the bed of particles becomes fluidized and circulates within the coater as described above. Filters, not shown, are located in the coater well above the inner cylinder to prevent particles from exiting the coater with the fluidizing air.

After the solvent has evaporated, the insoluble particle content of the coating on the ferromagnetic particles will comprise at least about 70% by weight of the coating and preferably between 75% and about 90% by weight. The balance will be soluble binder polymer. After coating, the particles are compression molded to the desired shape using sufficient temperature and pressure to cause the insoluble polymer particles to coalesce, and flow over, around and between the ferromagnetic particles so as to completely embed the ferromagnetic particles therein in a uniform distribution throughout while insulating each ferromagnetic particle from the next. This temperature will be at least the melt-flow temperature of the insoluble thermoplastic polymer.

Figure 2:
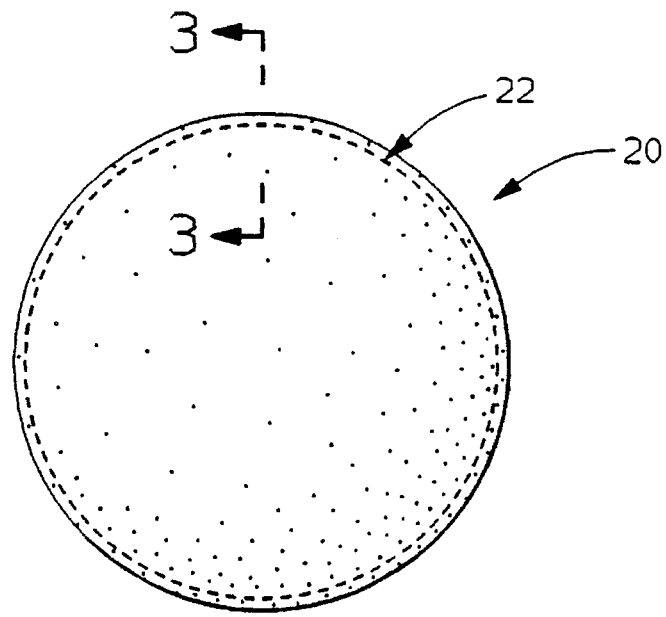
FIG. 2 illustrates an encapsulated ferromagnetic particle.
Figure 3:
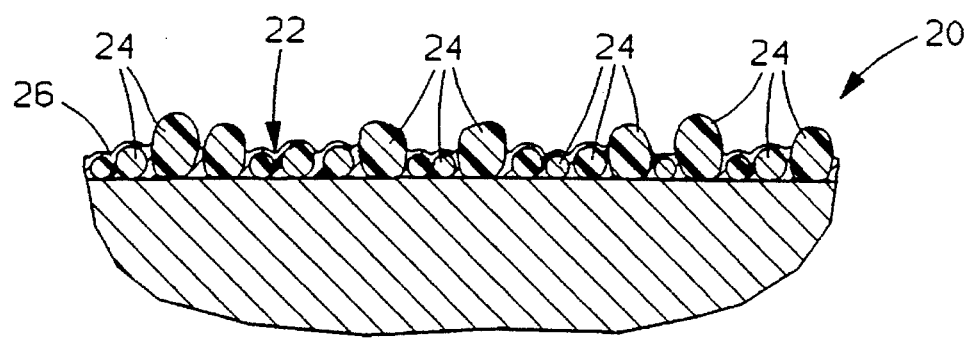
FIG. 3 illustrates a magnified portion of FIG. 2 taken in the direction 3—3 of FIG. 2.

FIGS. 2 and 3 are a draftsman's representation of a ferromagnetic particle 20 having an outer layer 22 comprising a plurality of substantially insoluble polymer particles 24 embedded in a film of soluble polymer 26.

EXAMPLE 1

15 Kg of iron particles (i.e., Hoeganaes 1000C) are spray-coated with a slurry comprising 5 percent by weight Nylon 11 (i.e., the insoluble polymer), 1.5 percent by weight polyetherimide (i.e., ULTEM, the soluble binder polymer) and 93.5 percent by weight methylene chloride (solvent) in a Wurster-type coater having a seven inch (7") diameter outer vessel (i.e., at the level of the perforated floor) and a three inch (3") diameter inner cylinder which is ten inches (10") long. The outer vessel widens to about 9 inches diameter through a distance of 16 inches above the floor and then becomes cylindrical. The bottom of the inner cylinder is about one half inch (½") above the floor of the coater. Fluidizing air at temperatures of about 55° C. is pumped through the perforations at a rate of about 350 m$^3$/hr. to fluidize and circulate the particles in a Wurster coater. The slurry is air sprayed through the nozzle 12 at a flow rate of about 40 grams/min. until a coating is built up which comprises 0.6 percent by weight of the coated iron particles. The coating itself comprises 80 percent nylon and 20 percent polyetherimide.

Soft magnetic cores are then compression molded from the coated particles. The coated particles are loaded into a supply hopper standing offset from and above a molding press. The particles are gravity fed into an auger-type particle feeding mechanism which substantially uniformly preheats the particles about 120° C. for 3 minutes while they are in transit to the tooling (i.e., punch and die) which is heated to about 225° C., the melting temperature of the nylon. The preheated particles are fed into a heated feed hopper which, in turn, feeds the die via a feed shoe which reciprocates back and forth between the feed hopper and the die. After the die is filled with particles, the heated punch enters the die, and presses the particles therein so as to coalesce the nylon polymer particles and cause the melt to flow over, around and between the ferromagnetic particles to form a continuous matrix for the iron particles. The pressed part is then removed from the die.

EXAMPLE 2

15 Kg of iron-neodymium-boron particles identified as grade MQP-B by their manufacturer, General Motors Corporation, are spray-coated with a slurry comprising 10 percent by weight polyvinylidene fluoride (PVDF) [i.e., the insoluble polymer], 1 percent by weight polystyrene (i.e., the soluble binder polymer) and 89 percent weight toluene (solvent) in the Wurster-type coater described above in Example 1. Fluidizing air at temperatures of about 70° C. is pumped through the perforations at a rate of about 350 m$^3$/hr. The slurry is air sprayed through the nozzle 12 at a flow rate of about 40 grams/min. until a coating is built up which comprises 2.2 percent by weight of the coated iron-neodymium-boron particles. The coating itself comprises 90 percent PVDF and 10 percent polystyrene.

Magnets are then compression molded from the coated particles in essentially the same manner as described in Example 1 except that the feeding mechanism preheats the particles to about 50° C. for 3 min. and the molding tooling (i.e., punch and die) is heated to about 125° C., the melt-flow temperature of the polystyrene.

EXAMPLE 3

15 Kg of iron particles (i.e., Hoeganaes 1000C) are spray-coated with a slurry comprising 5 percent by weight polyphenylene sulfide (i.e., PPS, the insoluble polymer), 1 percent by weight polyetherimide (i.e., ULTEM, the soluble binder polymer) and 94 percent by weight methylene chloride (solvent) in the Wurster-type coater described in Example 1. Fluidizing air at temperatures of about 55° C. is pumped through the perforations at a rate of about 350 m³/hr. The slurry is air sprayed through the nozzle 12 at a flow rate of about 40 grams/min. until a coating is built up which comprises 0.6 percent by weight of the coated iron particles. The coating itself comprises 80 percent PPS and 20 percent ULTEM.

Soft magnetic cores are then compression molded from the coated particles in essentially the same manner as described in Example 1 except that the feeding mechanism preheats the particles to about 160° C. for 3 minutes and the molding tooling (i.e., punch and die) is heated to about 315° C., the melt-flow temperature of the PPS.

EXAMPLE 4

15 Kg of MQP-B iron-neodymium-boron particles are spray-coated with a slurry comprising 10 percent by weight insoluble polyvinylidene fluoride (PVDF), 2 percent by weight soluble polyvinylidene fluoride (i.e., the binder polymer) and 88 percent weight n-n-dimethyl acetamide (i.e., the solvent) in the Wurster-type coater described above in Example 1. Fluidizing air at temperatures of about 80° C. is pumped through the perforations at a rate of about 350 m³/hr. The slurry is air sprayed through the nozzle 12 at a flow rate of about 40 grams/min. until a coating is built up which comprises 2.2 percent by weight of the coated iron-neodymium-boron particles. The coating itself comprises 80 percent insoluble PVDF and 20 percent soluble PVDF.

Magnets are then compression molded from the coated particles in essentially the same manner as described in Example 1 except that the feeding mechanism preheats the particles to about 50° C. for 3 min. and the molding tooling (i.e., punch and die) is heated to about 125° C., the melt-flow temperature of the insoluble PVDF.

EXAMPLE 5

15 Kg of MQP-B iron-neodymium-boron particles are spray-coated with a slurry comprising 10 percent by weight Nylon 11 (i.e., the insoluble polymer), 1 percent by weight polystyrene (i.e., the soluble binder polymer) and 89 percent weight toluene (i.e., solvent) in the Wurster-type coater described in Example 1. Fluidizing air at temperatures of about 70° C. is pumped through the perforations at a rate of about 350 m³/hr. The slurry is air sprayed through the nozzle 12 at a flow rate of about 40 grams/min. until a coating is built up which comprises 2.2 percent by weight of the coated iron-neodymium-boron particles. The coating itself comprise 90 percent Nylon 11 and 10 percent polystyrene.

Magnetics are then compression molded from the coated particles in essentially the same manner as described in Example 1 except that the feeding mechanism preheats the particles to about 120° C. for 3 min. and the tooling (i.e., punch and die) is heated to about 225° C., the melt-flow temperature of the nylon.

EXAMPLE 6

15 Kg of MQP-B iron-neodymium-boron particles are spray-coated with a slurry comprising 10 percent by weight polyphenylene sulfide (i.e., PPS, the insoluble polymer), 1 percent by weight polystyrene (i.e., the soluble binder polymer) and 89 percent weight toluene (i.e., solvent) in the Wurster-type coater described in Example 1. Fluidizing air at temperatures of about 70° C. is pumped through the perforations at a rate of about 350 m³/hr. The slurry is air sprayed through the nozzle 12 at a flow rate of about 40 grams/min. until a coating is built up which comprises 2.2 percent by weight of the coated iron-neodymium-boron particles. The coating itself comprises 90 percent PPS and 10 percent polystyrene.

Magnets are then compression molded from the coated particles in essentially the same manner as described in Example 1 except that the feeding mechanism preheats the particles to about 120° C. for 3 min. and the tooling (i.e., punch and die) is heated to about 315° C., the melt-flow temperature of the PPS.

EXAMPLE 7

15 Kg of iron particles (i.e., Hoeganaes 1000C) are spray-coated with a slurry comprising 5 percent by weight polybenzimidazole (i.e., PBI, the insoluble polymer), 1 percent by weight polyetherimide (i.e., ULTEM, the soluble binder polymer) and 94 percent by weight methylene chloride (i.e., solvent) in the Wurster-type coater described in Example 1. Fluidizing air at temperatures of about 55° C. is pumped through the perforations at a rate of about 350 m³/hr. and to fluidize and circulate the particles in a Wurster coater. The slurry is air sprayed through the nozzle 12 at a flow rate of about 40 grams/min. until a coating is built up which comprises 0.8 percent by weight of the coated iron particles. The coating itself comprises 80 percent PBI and 20 percent ULTEM.

Soft magnetic cores are then compression molded from the coated particles in essentially the same manner as described in Example 1 except that the feeding mechanism preheats the particles to about 160° C. for 3 minutes, and the molding tooling (i.e., punch and die) is heated to about 300° C., the melt-flow temperature of the PBI.

While the invention has been disclosed in terms of a specific embodiments thereof it is not intended to be limited thereto but rather only to the extent set forth hereafter in the claims which follow.

The embodiments of the invention in which an exclusive property or privilege is claimed are defined as follows:

1. A method of making a magnetizable molding comprising a plurality of ferromagnetic particles each being insulated one from the next throughout said molding, said particles being distributed throughout a matrix of a thermoplastic polymer having a melt-flow temperature suitable to the end use of said molding comprising the steps of:

preparing a solution of a soluble binder polymer in a suitable solvent for spray-coating said ferromagnetic particles at a suitable coating temperature;

mixing particles of said thermoplastic polymer with said solution to form a slurry of said thermoplastic polymer particles in said solution, said thermoplastic polymer particles being substantially insoluble in said solution at said coating temperature;

spray-coating said ferromagnetic particles at said coating temperature with said slurry in a fluidized stream of said ferromagnetic particles so as to coat the surface of each of said ferromagnetic particles with said slurry;

evaporating said solvent from said slurry so as to leave a residual coating adhering to said surface and encapsulating said ferromagnetic particles, said residual coating comprising on a weight basis a majority amount of said thermoplastic particles dispersed throughout a lesser amount of said soluble binder polymer;

heating said coated ferromagnetic particles in a mold to at least about said melt-flow temperature;

compressing said coated particles in said mold under sufficient pressure to cause said thermoplastic particles adhering to said ferromagnetic particles to coalesce with each other and to flow over, around and between said ferromagnetic particles to form said matrix; and cooling said compressed particles to solidify said matrix.

2. A method according to claim 1 wherein said ferromagnetic particles comprise iron for molding into a soft magnetic core.

3. A method according to claim 2 wherein said residual coating comprises about 0.1% to about 2.5% by weight of said coated particles.

4. A method according to claim 1 wherein said ferromagnetic particles comprise hard magnetic particles.

5. A method according to claim 3 wherein said hard magnetic particles comprise magnetic alloys of the rare earth metals.

6. A method according to claim 4 wherein said coated particles comprise about 0.1% to about 5% by weight of said residual coating.

7. A method according to claim 1 wherein said thermoplastic polymer comprises at least about 70% by weight of said residual coating.

8. A method according to claim 1 wherein said thermoplastic polymer is selected from the group consisting of polyphenylene sulfide, polyphthalamide, polybenzimidazole, polyamides, polyesters, and fluorocarbons.

9. A method according to claim 1 wherein said soluble binder polymer is selected from the group consisting of polyetherimide, polyacrylate, polystyrene, polycarbonate, and polyethersulfone.

10. A method according to claim 1 wherein said soluble binder polymer is a thermoplastic.

11. A method according to claim 1 wherein said soluble binder polymer is a soluble, lower molecular weight variant of the thermoplastic polymer.

12. A method of making a magnetizable molding comprising a plurality of ferromagnetic particles each being insulated one from the next throughout said molding, said particles being distributed throughout a matrix of a thermoplastic polymer having a melt-flow temperature suitable to the end use of said molding comprising the steps of:

spray-coating said ferromagnetic particles with said slurry in a fluidized stream of said ferromagnetic particles so as to coat the surface of each of said ferromagnetic particles with said slurry;

evaporating said solvent from said slurry so as to leave a residual coating adhering to said surface and encapsulating said ferromagnetic particles, said residual coating comprising on a weight basis a majority amount of said undissolved thermoplastic particles dispersed throughout a lesser amount of dissolved thermoplastic polymer;

heating said coated ferromagnetic particles in a mold to at least about said melt-flow temperature;

compressing said coated particles in said mold under sufficient pressure to cause said thermoplastic particles adhering to said ferromagnetic particles to coalesce with each other and to flow over, around and between said ferromagnetic particles to form said matrix; and cooling said compressed particles to solidify said matrix.

* * * * *

UNITED STATES PATENT AND TRADEMARK OFFICE
CERTIFICATE OF CORRECTION

PATENT NO. : 5,567,746

DATED : October 22, 1996

INVENTOR(S) : David E. Gay

It is certified that error appears in the above-identified patent and that said Letters Patent is hereby corrected as shown below:

Claim 3, Column 9, lines 14-16 should read as follows:

-- 3. A method according to claim 2 wherein said coated particles comprise about 0.1% to about 2.5% by weight of said residual coating. --

Claim 12, Column 10, lines 6-11 should read as follows:

-- 12. A method of making a magnetizable molding comprising a plurality of ferromagnetic particles each being insulated one from the next throughout said molding, said particles being distributed throughout a matrix of a thermoplastic polymer having a melt-flow temperature suitable to the end use of said molding comprising the steps of:

preparing a slurry of said thermoplastic polymer in a suitable solvent, said thermoplastic polymer being partially soluble in said solvent, whereby said slurry comprises a solution of said thermoplastic polymer dissolved

UNITED STATES PATENT AND TRADEMARK OFFICE
CERTIFICATE OF CORRECTION

PATENT NO. : 5,567,746
DATED : October 22, 1996
INVENTOR(S) : David E. Gay

It is certified that error appears in the above-indentified patent and that said Letters Patent is hereby corrected as shown below:

in said solvent and undissolved particles of said thermoplastic polymer suspended in said solution;

Signed and Sealed this

Twenty-seventh Day of May, 1997

Attest:

BRUCE LEHMAN

Attesting Officer

Commissioner of Patents and Trademarks